United States Patent [19]

Niewold et al.

[11] Patent Number: 5,067,571

[45] Date of Patent: Nov. 26, 1991

[54] AUGER PLANTER

[75] Inventors: D. Wayne Niewold, Loda; Richard A. Bradley, Urbana, both of Ill.

[73] Assignee: Power Planter, Inc., Paxton, Ill.

[21] Appl. No.: 388,744

[22] Filed: Aug. 1, 1989

Related U.S. Application Data

[63] Continuation of Ser. No. 178,531, Apr. 7, 1988, abandoned.

[51] Int. Cl.5 .............................................. E21B 10/44
[52] U.S. Cl. ..................................... 175/394; 175/385
[58] Field of Search ................ 175/62, 170, 310, 323, 175/327, 385, 395, 397, 403, 410, 411, 394; 198/676, 677; 299/87; 408/125, 210, 230

[56] References Cited

U.S. PATENT DOCUMENTS

| | | | |
|---|---|---|---|
| 3,356,168 | 12/1967 | Johnson | 175/394 |
| 4,185,707 | 1/1980 | Wilson | 175/394 |
| 4,282,943 | 8/1981 | Leitner | 175/394 |
| 4,653,245 | 3/1987 | Webb | 175/394 |
| 4,742,656 | 5/1988 | Farmer | 175/394 |
| 4,807,710 | 2/1989 | Greeley | 175/394 |

*Primary Examiner*—Stephen J. Novosad
*Attorney, Agent, or Firm*—Lockwood, Alex, FitzGibbon & Cummings

[57] ABSTRACT

An auger planter is provided for forming small holes in the earth for the planting of flower bulbs and the like. The auger includes a central shaft and a single flighting having its leading and trailing ends truncated. When used, the single flighted auger exhibits minimal eccentric orbital rotation and minimizes inadvertent injury to the user.

30 Claims, 1 Drawing Sheet

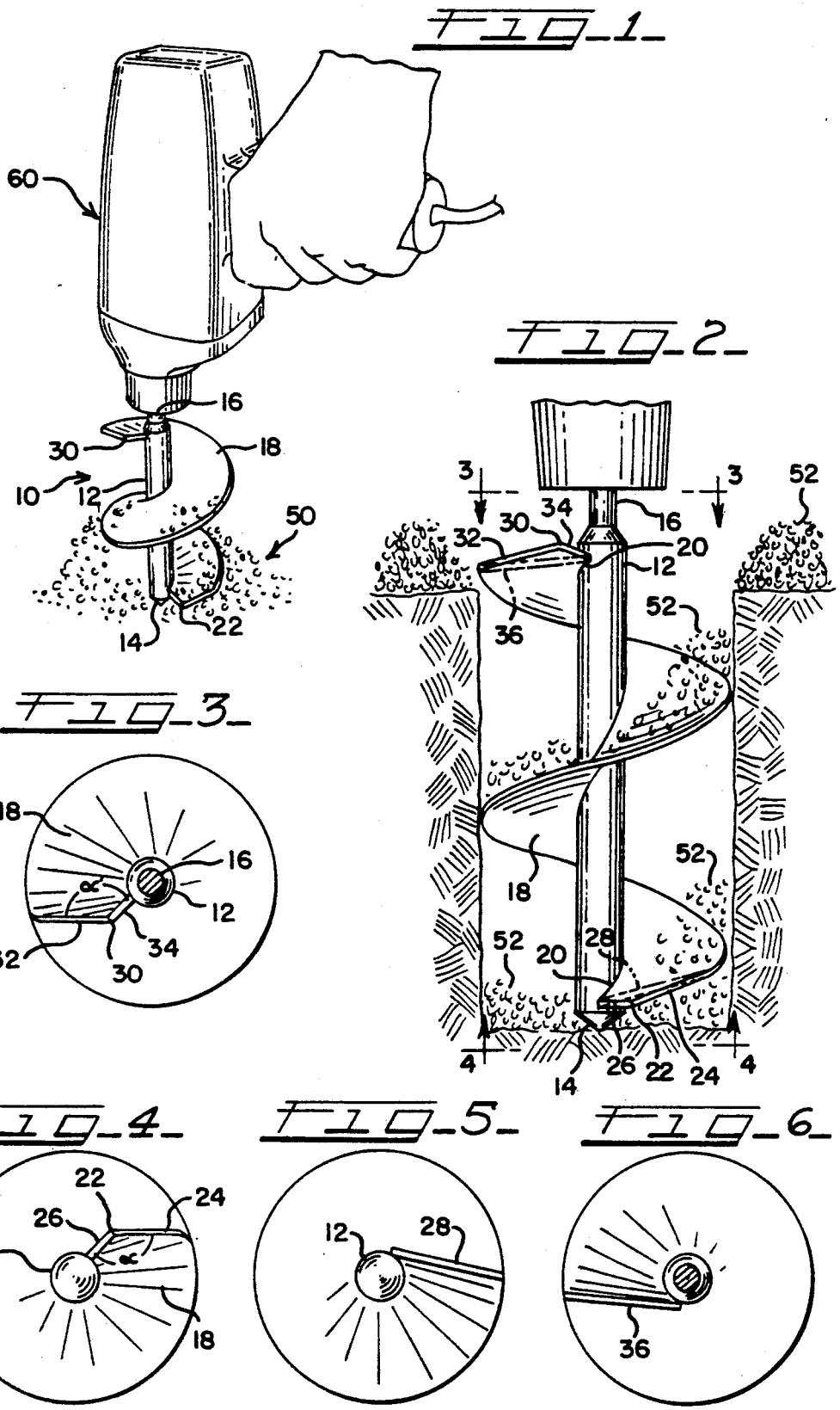

AUGER PLANTER

This application is a continuation of application Ser. No. 178,531, filed Apr. 7, 1988.

BACKGROUND AND SUMMARY OF THE INVENTION

The present invention generally relates to an improved auger planter and, more particularly, to a single flighted auger planter. The invention is particularly suitable for use in planting flower bulbs and plant seedlings, although it is also useful for virtually any type of application for boring small, shallow holes in the earth.

In any number of gardening applications, there is a need for a device for forming small shallow holes in the ground. For instance, a landscaper or home gardener often forms small, shallow holes in the earth for bulb and seedling planting. Depending upon the ground condition, the number of holes to be dug, and the device used to form such holes, the job can be laborous and time consuming.

Hand operated cylindrical soil cutters have been employed in the past to remove plugs of earth to form small, shallow holes for bulbs and the like. In addition to requiring exhausting manual labor in the use of such cylindrical cutters, one disadvantage in such cutters is that the plug of earth which is removed must subsequently be broken apart to refill the hole after placement of the bulb.

Scoop shaped garden trowels have also been utilized in the past for setting bulbs and the like. Although such trowels provide a means for removing earth in a looser fashion than the cylindrical plug removers, they also require extensive manual labor. Furthermore, it is often desirable to provide a series of uniform holes in the soil, but this is time consuming and/or difficult to achieve with hand held garden trowels.

Earth boring augers have also been utilized in the past to more rapidly bore uniform holes in the earth. Such augers have typically been double flighted, so that the auger does not vibrate or move in an orbital motion as it enters the ground. Such double flighted earth boring augers suffer several disadvantages. One disadvantage is that when holes are formed for the purpose of setting bulbs and the like, it is advantageous to mound the removed soil close to the hole so it will be convenient to refill the hole after the planting step. Double flighted augers, however, tend to throw the dirt too far from the hole to conveniently replace the earth after planting the bulb. Another disadvantage is that double flighted augers tend to plug faster than single flighted augers due to the smaller distance between the flights. Furthermore, double flighted augers tend to be more complex and expensive to produce than single flighted augers.

Single flighted earth boring augers also have been employed in the past for planting. However, they also have suffered certain disadvantages. The prior single flighted augers tend to be rotationally imbalanced compared to the double flighted augers and therefore vibrate or move in an orbital motion. Prior attempts to cure such rotational imbalance have included the approach disclosed in U.S. Pat. No. 3,356,168. In that patent a single flighted auger is disclosed in which the flighting is secured to the shaft by spot welding spaced along and balanced around the shaft in an attempt to minimize rotational imbalance. This approach results in more complex manufacturing procedures and increases the expense of such augers. Even if the potential rotational imbalance problem is overcome, prior single flighted augers have also posed a safety problem to the user due to sharp edged terminal ends of the flighting which can catch the clothing of the user or cut the user's body.

An auger planter incorporating the principles of the present invention overcomes most if not all of the aforementioned disadvantages. An auger planter incorporating the principles of the present invention is easy and safe to use, requires minimal manual labor, is relatively easy and inexpensive to manufacture, removes the soil from the hole in a loose fashion, and mounds the loose soil in close proximity to the hole.

The present invention achieves all of these advantages utilizing an improved single flighted auger having a central shaft which may be powered by a hand drill. The central shaft supports a single flighting having its leading tip, and preferably also its terminal tip, removed or cut back to allow the auger to enter the soil with a minimum imbalance and undesirable vibration and eccentric orbital motion. The truncated or cut back ends of the flighting are preferably blunt thereby minimizing the danger of cutting the body of a person using the auger or of having clothing caught by the flighting ends.

These and other features and advantages of the present invention will be apparent upon considering the following detailed description.

BRIEF DESCRIPTION OF THE DRAWINGS

In the course of this description, reference will frequently be made to the attached drawing in which:

FIG. 1 is a perspective view of one preferred embodiment of an auger planter incorporating the principles of the present invention and illustrating the auger in use with a hand held power drill;

FIG. 2 is a side elevational view of the auger planter substantially as shown in FIG. 1 and illustrating the manner in which soil is removed to form a planting hole;

FIG. 3 is a cross sectioned top plan view, as viewed substantially along line 3—3 of FIG. 2, and showing the upper trailing edge construction of the auger;

FIG. 4 is a cross sectioned bottom plan view, as view, as viewed substantially along line 4—4 of FIG. 2, and showing the bottom leading edge construction of the auger;

FIG. 5 is a cross sectioned bottom plan view showing a second embodiment of the bottom leading edge construction of an auger planter incorporating the principles of the invention; and FIG. 6 is a cross sectioned top plan view showing a second embodiment of the upper trailing leading edge construction of an auger planter incorporating the principles of the invention.

DETAILED DESCRIPTION OF THE PREFERRED EMBODIMENTS

A preferred embodiment of auger planter incorporating the principles of the present invention is generally illustrated at 10 in FIGS. 1–3. The auger planter comprises an auger 10 which includes a central shaft 12 having a bottom leading end 14 and a trailing terminal end 16. Leading end 14 preferably is tapered to facilitate initial placement of the auger against the soil 50, as well as to facilitate and help stabilize the progression of the auger into the ground. In this regard, the taper of leading edge 14 is preferably approximately 30°.

The trailing terminal end 16 of the shaft is adapted to be mounted in the collet of a hand held drill 60. The outer diameter of central shaft 12 and the outer diameter of trailing terminal end 16 can be the same or different. In this regard, it is preferred that auger 10 will be used in association with a standard ¼ or ⅜ inch home hand drill. Accordingly, terminal end 16 of the shaft is preferably dimensioned so as to be adaptable for use in the collet of such drills. Central shaft 12, however, preferably has an outer diameter somewhat greater than ⅜ inches to provide added stability and strength to auger 10. It has been found that a ⅝ inch outer diameter for central shaft 12 provides sufficient strength and stability to auger 10 and does not interfere with the progression of auger 10 into soil 50.

The auger 10 includes flighting 18 which is of a helical or spiral configuration and which is secured along its inner edge 20 to central shaft 12 by suitable means such as spot welding or molding integrally with the shaft. Flighting 18 preferably is right handed to compliment common right handed power drills. It will be appreciated that the width and pitch between flights, of flighting 18 can vary without departing from the principles of the invention. It will further be appreciated that the number of revolutions of flighting 10 can also vary. It has been found that for home gardening use a flighting having a three (3) inch outer diameter, a three (3) inch pitch between flights, and approximately two full revolutions is sufficient to form holes for typical bulb setting and can easily be handled by the horsepower of typical hand held home power drills.

Central shaft 12 and flighting 18 may be formed of the same or different materials. The material used for the central shaft 12 and flighting 18 should be rigid and durable. Typically, central shaft 12 and flighting 18 will be formed of a suitable metal, but may be formed of rigid plastics or resins. Furthermore, central shaft 12 and flighting 18 may be constructed of separate parts or integrally molded in a manner known to those skilled in the art.

In a first preferred embodiment the lead portion of flighting 18 is truncated or removed to provide a leading edge 22 proximate to the lead end 14. As best seen in FIG. 4, the leading edge 22 comprises a chord portion 24 extending chordally substantially across the flighting 18 on one side of the shaft to a point of intersection with the outer edge of flighting 18. Leading edge 22 also has a radial portion 26 extending outwardly from central shaft 12 to a point of intersection with chord portion 24. Preferably, radial portion 26 and chord portion 24 intersect at an obtuse angle $\alpha$ with portion 24 extending away from the direction of advance of the flighting into the soil. In this regard, the ratio of the length of chord portion 24 to the length of radial portion 26 is preferably about 2:1. With specific reference, for the purpose of illustration only and not limitation, to a flighting having a three inch outer diameter and a ⅜ inch core to accommodate a ⅝ inch shaft, the length of radial portion 26 would be approximately ¼ inch and the length of chord portion 24 would be approximately 1⅛ inch. One or both the chord or radial portions 24 and 26 of the leading edge 22 are preferably blunted to prevent accidental cuts, to prevent leading edge 22 from becoming caught in clothing, and to impede eccentric oscillation of the single flighted auger 10.

The other end of flighting 18 of the first embodiment also terminates in a trailing edge 30. As best seen in FIG. 3, the trailing edge 30, is preferably of similar construction to the leading edge 22 and includes a chord portion 32 extending chordally substantially across the flighting 18 on one side of the shaft to a point of intersection with the outer edge of flighting 18. Trailing edge 30 also has a radial portion 34 extending outwardly from central shaft 12 to a point of intersection with chord portion 32. The trailing edge chord portion 32 and radial, portion 34 also preferably intersect at an obtuse angle $\alpha'$ with portion 32 extending toward the direction of advance of the flighting into the soil. The ratio of the length of chord portion 32 to the length of radial portion 34 may also be about 2:1.

Alternate embodiments of auger leading and trailing edges are shown in FIGS. 5 and 6. In FIG. 5 which illustrates the flighting leading edge of this embodiment, the chord portion 28, shown in phantom in FIG. 2, extends entirely across the flighting 18 on one side of the shaft. In FIG. 6 which illustrates the flighting trailing edge of this embodiment, the chord portion 36, also shown in phantom in FIG. 2, extends entirely across the flighting 18 on one side of the shaft. The trailing edge chord portion 36, as well as leading edge chord portion 28 are preferably blunted in this embodiment so as to prevent accidental injury to the user including accidental cuts and the catching of loose clothing, and the leading edge is also blunted to impede eccentric orbital rotation of auger 10 as it penetrates the soil 50; As shown in FIGS. 2, 5 and 6, the leading edge chord portion 28 and trailing edge chord portion 36 also extend away from and toward, respectively, the direction of advance of the flighting into the soil.

In either the embodiment shown in FIG. 3 or the embodiment shown in FIG. 6, the trailing edge chord portion 32 or chord portion 36, respectively, is preferably angularly disposed to central shaft 12 such that the line of sight along respective chord portion 32 or 36 does not intersect the center of the central shaft 12. Also to minimize undesirable eccentric orbital motion, the chord portion of leading edge 22 and the chord portion of trailing edge 30 are preferably substantially planar to each other in a vertical plane extending substantially parallel to the axis of central shaft 12 as viewed in FIG. 2.

In use, as illustrated in FIGS. 1 and 2, the leading edge 22 of auger 10, enters the soil 50 at an acute angle. As auger 10 is rotated and penetrates the soil 50, loose soil 52 is moved to the surface and accumulates in close proximity to the hole being bored. Additionally, when auger 10 is removed from the hole, some loose soil remains in the bottom of the hole. This remaining loose soil promotes bulb and seedling root growth.

It will be apparent to those skilled in this art that the present invention can be embodied in various forms; accordingly, this invention is to be construed and limited only by the scope of the appended claims.

What is claimed is:

1. An auger planter for the forming of small diameter holes in the soil of a depth suitable for the planting of flower bulbs and the like, comprising a helical flighting for advancing into the soil and a central shaft extending substantially axially through said helical flighting, said central shaft terminating at one end in a leading end of said shaft, said helical flighting terminating in a leading edge proximate to said leading end of said shaft, said helical flighting having an outer helically extending edge, said leading edge being defined by a chord portion extending chordally substantially across the flighting on one side of said shaft to a point of intersection with said helically extending edge and away from the direction of advance of said flighting into the soil, said helical flighting having a diameter and distance between adjacent flights which are approximately equal to each other, said helical flighting extending more than one revolution about said shaft and along said shaft for a distance greater than the depth of the hole to readily lift the soil from the hole as the flighting is advanced into the hole, and said leading edge further including a radial portion extending outwardly from said central shaft to a point of intersection with said chord portion.

2. The auger of claim 1 wherein said leading end of said shaft is tapered.

3. The auger of claim 2 wherein said taper is approximately 30°.

4. The auger of claim 1 wherein the other end of said central shaft has an end portion adapted to be mounted in a hand held drill.

5. The auger of claim 4 wherein the outer diameter of said central shaft is greater than the outer diameter of said end portion adapted to be mounted in the drill.

6. The auger of claim 1 wherein said radial portion and said chord portion intersect each other at an obtuse angle.

7. The auger of claim 1 wherein the other end of said helical flighting opposite said leading edge terminates in a trailing edge, said trailing edge having a chord portion extending chordally substantially across the flighting from adjacent one side of said shaft to a point of intersection with said helically extending edge and toward the direction of advance of the flighting into the soil.

8. The auger of claim 7 wherein said trailing edge further includes a radial portion extending outwardly from said central shaft to a point of intersection with said trailing edge chord portion.

9. The auger of claim 7 wherein said leading edge chord portion and said trailing edge chord portion are substantially planar to each other in a plane extending substantially parallel to the axis of said central shaft.

10. The auger of claim 8 wherein at least one of said leading and trailing edges are blunt.

11. An auger planter for the forming of small diameter holes in the soil of a depth suitable for the planting of flower bulbs and the like, comprising an auger having a central shaft and helical flighting for advancing into the soil, said central shaft terminating at one end in a tapered leading end, the other end of said central shaft terminating in a trailing end adapted to be mounted in a hand held power drill, said flighting terminating in a leading edge proximate to said shaft leading end, said leading edge being blunt and having a chord portion extending chordally substantially across said flighting, said chord portion being angularly disposed to said central shaft such that the line of sight along said chord portion does not intersect the center of said central shaft and away from the direction of advance of said flighting into the soil, said helical flighting having a diameter and distance between adjacent flights which are approximately equal to each other, said helical flighting extending more than one revolution about said shaft along said shaft for a distance greater than the depth of the hole to readily lift soil from the hole as the flighting is advanced into the hole.

12. The auger of claim 11 wherein the end of said helical flighting opposite said leading edge terminates in a trailing edge, said trailing edge having a chord portion extending on one side of said shaft, said trailing edge chord portion being angularly disposed to said central shaft such that the line of sight along said chord portion does not intersect the center of said central shaft.

13. The auger of claim 12 wherein said leading edge chord portion and said trailing edge chord portion are substantially planar to each other in a plane extending substantially parallel to the axis of said central shaft.

14. The auger of claim 13 wherein said leading edge further includes a radial portion extending outwardly from said central shaft to a point of intersection with the radially inner portion of said leading edge chord portion, said trailing edge also including a radial portion extending outwardly from said central shaft to a point of intersection with said trailing edge chord portion, said leading edge radial portion and leading edge chord portion intersecting each other at an obtuse angle, and said trailing edge radial portion and said trailing edge chord portion intersect at an obtuse angle.

15. The auger of claim 12, wherein said leading edge and trailing edge chord portions extend respectively away from and toward the direction of advance of the flighting into the soil.

16. An auger planter for the forming of small diameter holes in the soil for the planting of flower bulbs and the like, comprising a helical flighting for advancing into the soil and a central shaft extending substantially axially through said helical flighting, said central shaft terminating at one end in a leading end of said shaft, said helical flighting terminating in a leading edge proximate to said leading end of said shaft, said helical flighting having an outer helically extending edge, said leading edge being defined by a chord portion extending chordally substantially across the flighting on one side of said shaft to a point of intersection with said helically extending edge and away from the direction of advance of said flighting into the soil, the other end of said helical flighting opposite said leading edge terminating in a trailing edge, said trailing edge having a chord portion extending chordally substantially across the flighting from adjacent one side of said shaft to a point of intersection with said helically extending edge and toward the direction of advance of the flighting into the soil, and said helical flighting having a diameter and distance between adjacent flights to readily lift the soil from the hole as the flighting is advanced into the hole.

17. The auger of claim 16 wherein said trailing edge further includes a radial portion extending outwardly from said central shaft to a point of intersection with said trailing edge chord portion.

18. The auger of claim 16 wherein said leading edge chord portion and said trailing edge portion are substantially planar to each other in a plane extending substantially parallel to the axis of said central shaft.

19. The auger of claim 16 wherein said trailing edge chord portion extends entirely across said flighting on one side of the shaft.

20. The auger of claim 16 wherein said leading edge chord portion extends entirely chordally across said flighting on one side of said shaft, said trailing edge chord portion extends entirely chordally across said flighting on one side of said shaft, and said leading edge chord portion and said trailing edge chord portion are substantially planar to each other in a plane extending substantially parallel to the axis of said central shaft.

21. An auger planter for the forming of small diameter holes in the soil for the planting of flower bulbs and the like, comprising an auger having a central shaft and helical flighting for advancing into the soil, said central shaft terminating at one end in a tapered leading end, the other end of said central shaft terminating in a trailing end adapted to be mounted in a hand held power drill, said flighting terminating in a leading edge proximate to said shaft leading end, said leading edge having a chord portion extending chordally substantially across said flighting, said chord portion being angularly disposed to said central shaft such that the line of sight along said chord portion does not intersect the center of said central shaft and away from the direction of advance of said flighting into the soil, the end of said helical flighting opposite said leading edge terminating in a trailing edge, said trailing edge having a chord portion extending chordally substantially across said flighting on one side of said shaft, said trailing edge chord portion being angularly disposed to said central shaft such that the line of sight along said chord portion does not intersect the center of said central shaft, said leading edge and trailing edge chord portions extending respectively away from and toward the direction of advance of the flighting into the soil, and said helical flighting having a diameter and distance between adjacent flights to readily lift soil from the hole as the flighting is advanced into the hole.

22. An auger planter for the forming of small diameter holes in the soil of a depth suitable for the planting of flower bulbs and the like, comprising a helical flighting for advancing into the soil and a central shaft extending substantially axially through said helical flighting, said central shaft terminating at one end in a leading edge proximate to said leading end of said shaft, said helical flighting having an outer helically extending edge, said leading edge being defined by a chord portion extending chordally substantially across the flighting on one side of said shaft to a point of intersection with said helically extending edge and away from the direction of advance of said flighting into the soil, said helical flighting having a diameter and distance between adjacent flights which are approximately equal to each other, said helical flighting extending more than one revolution about said shaft and along said shaft for a distance greater than the depth of the hole to readily lift the soil from the hole as the flighting is advanced into the hole; and wherein the other end of said helical flighting opposite said leading edge terminates in a trailing edge, said trailing edge having a chord portion extending chordally substantially across the flighting from adjacent one side of said shaft to a point of intersection with said helically extending edge and toward the direction of advance of the flighting into the soil.

23. The auger of claim 22 wherein said trailing edge further includes a radial portion extending outwardly from said central shaft to a point of intersection with said trailing edge chord portion.

24. The auger of claim 22 wherein said leading edge chord portion and said trailing edge chord portion are substantially planar to each other in a plane extending substantially parallel to the axis of said central shaft.

25. The auger of claim 22 wherein said trailing edge chord portion extends entirely across said flighting on one side of the shaft.

26. The auger of claim 22 wherein said leading edge chord portion extends entirely chordally across said flighting on one side of said shaft, said trailing edge chord portion extends entirely chordally across said flighting on one side of said shaft, and said leading edge chord portion and said trailing edge chord portion are substantially planar to each other in a plane extending substantially parallel to the axis of said central shaft.

27. The auger of claim 22 wherein at least one of said leading and trailing edges are blunt.

28. An auger planter for the forming of smaller diameter holes in the soil of a depth suitable for the planting of flower bulbs and the like, comprising a helical flighting for advancing into the soil and a central shaft extending substantially axially through said helical flighting, said central shaft terminating at one end in a leading end of said shaft, said helical flighting terminating in a leading edge proximate to said leading end of said shaft, said helical flighting having an outer helically extending edge, said leading edge being defined by a chord portion extending chordally entirely across the flighting on one side of said shaft to a point of intersection with said helically extending edge and away from the direction of advance of said flighting into the soil, said helical flighting having a diameter and distance between adjacent flights which are approximately equal to each other, and said helical flighting extending more than one revolution about said shaft and along said shaft for a distance greater than the depth of the hole to readily lift the soil from the hole as the flighting is advanced into the hole.

29. An auger planter for the forming of small diameter holes in the soil of a depth suitable for the planting of flower bulbs and the like, comprising an auger having a central shaft and helical flighting for advancing into the soil, said central shaft terminating at one end in a tapered leading end, the other end of said central shaft terminating in a trailing end adapted to be mounted in a hand held power drill, said flighting terminating in a leading edge proximate to said shaft leading end, said leading edge having a chord portion extending chordally substantially across said flighting, said chord portion being angularly disposed to said central shaft such that the line of sight along said chord portion does not intersect the center of said central shaft and away from the direction of advance of said flighting into the soil, said helical flighting having a diameter and distance between adjacent flights which are approximately equal to each other, said helical flighting extending more than one revolution about said shaft and along said shaft for a distance greater than the depth of the hole to readily lift soil from the hole as the flighting is advanced into the hole, said leading edge chord portion and said trailing edge chord portion are substantially planar to each other in a plane extending substantially parallel to the axis of said central shaft, and wherein said leading edge further includes a radial portion extending outwardly from said central shaft to a point of intersection with the radially inner portion of said leading edge chord portion, said trailing edge also including a radial portion, said trailing edge also including a radial portion, said trailing edge also including a radial portion extending outwardly from said central shaft to a point of intersection with said trailing edge chord portion, said leading edge radial portion and leading edge chord portion intersecting each other at an obtuse angle, and said trailing edge radial portion and said trailing edge chord portion intersect at an obtuse angle.

30. An auger planter for the forming of small diameter hole sin the soil of a depth suitable for the planting of flower bulbs and the like, comprising the auger having a central shaft and helical flighting for advancing into a soil, said central shaft terminating at one end in a tapered leading end, the other end of said central shaft terminating in a trailing end adapted to be mounted in a hand held power drill, said flighting terminating in a leading edge proximate to said shaft leading end, said leading edge having a chord portion extending chordally substantially across said flighting, said chord portion being angularly disposed to said central shaft such that the line of sigh along said chord portion does not intersect the center of said central shaft and away from the direction of advance of said flighting into the soil, said helical flighting having a diameter and distance between adjacent flights which are approximately equal to each other, said helical flighting extending more than one revolution about said shaft and along said shaft for a distance greater than the depth of the hole to readily lift soil from the hole as the flighting is advanced into the hole, the end of said helical flighting opposite said leading edge terminating in a trailing edge, said trailing edge having a chord portion extending chordally substantially across said flighting on one side of said shaft, said trailing edge chord portion being angularly disposed to said central shaft such that the line of sight along said chord portion does not intersect the center of said central shaft, and wherein said leading edge and trailing edge chord portions extend respectively away from and toward the direction of advance of the flighting into the soil.

* * * * *